June 22, 1937.　　A. R. COVIELLO　　2,084,629
REVERSIBLE DISK PLOW
Filed Aug. 24, 1936　　3 Sheets-Sheet 1
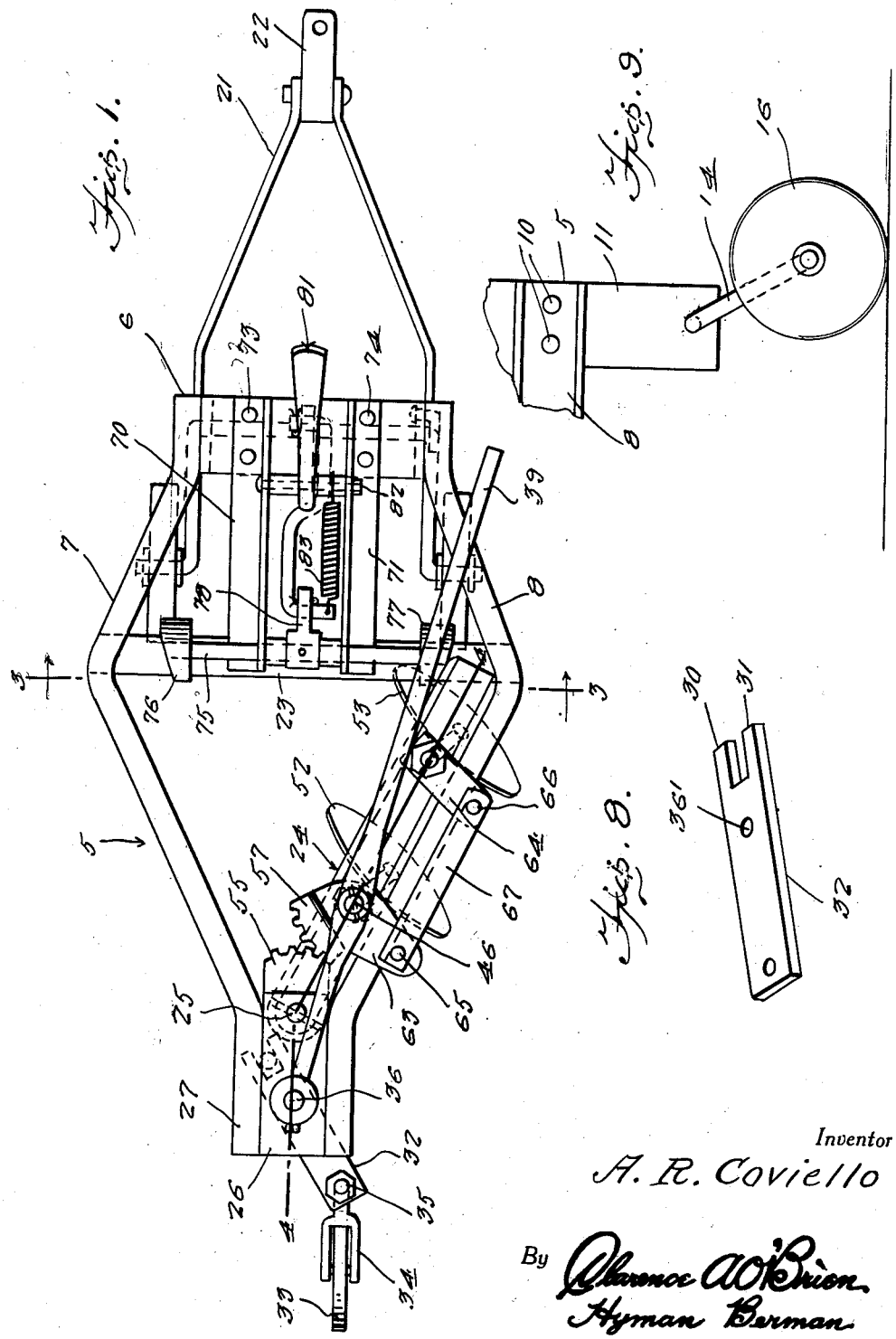
Inventor
*A. R. Coviello*
By *Clarence A. O'Brien*
*Hyman Berman*
　　　　　Attorneys June 22, 1937.   A. R. COVIELLO   2,084,629
REVERSIBLE DISK PLOW
Filed Aug. 24, 1936   3 Sheets-Sheet 2
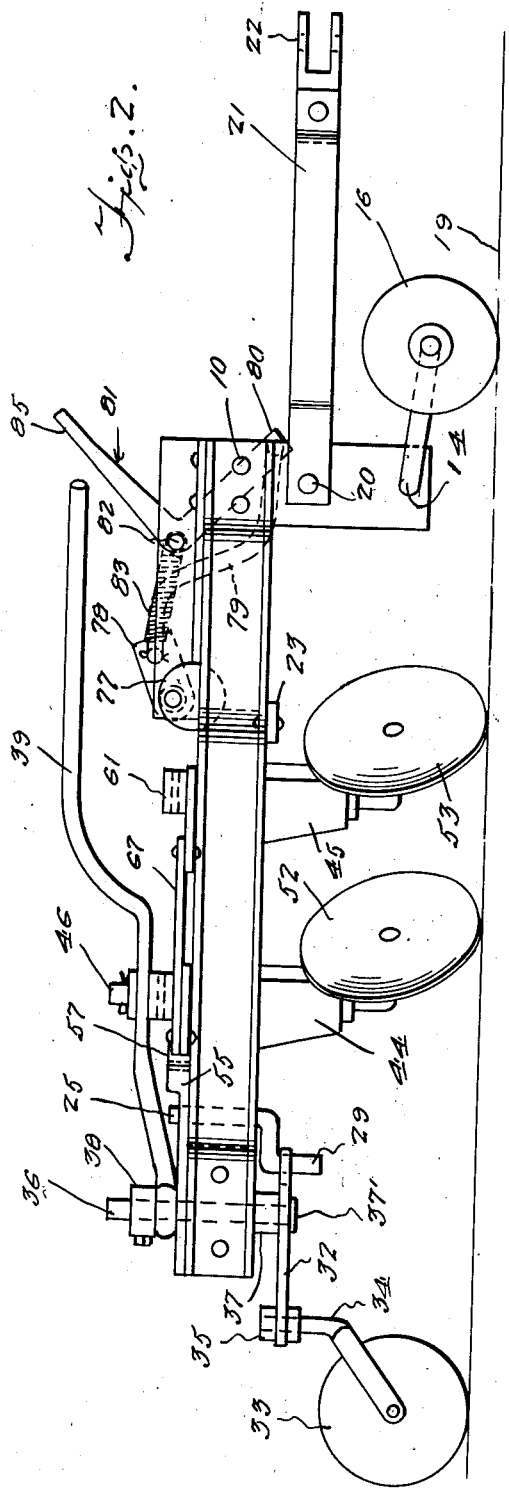
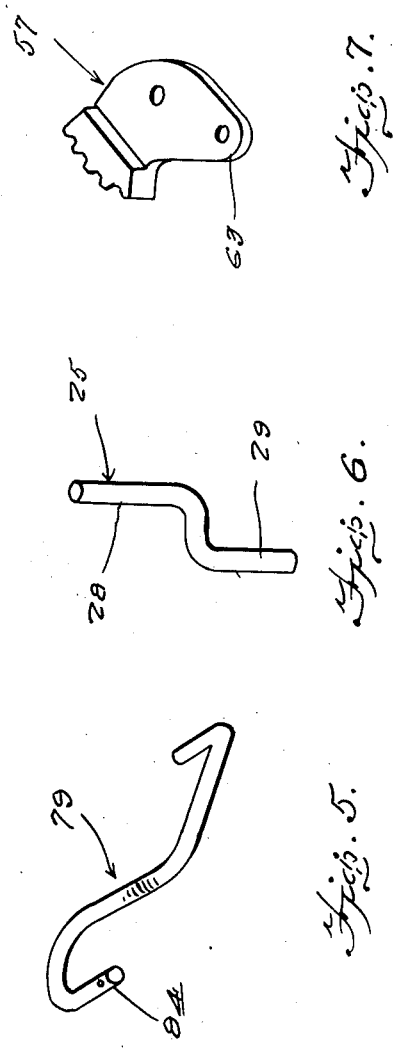
Inventor
A. R. Coviello
By Clarence A. O'Brien
Hyman Berman
Attorneys June 22, 1937.  A. R. COVIELLO  2,084,629
REVERSIBLE DISK PLOW
Filed Aug. 24, 1936   3 Sheets-Sheet 3

Inventor
A. R. Coviello
By Clarence A. O'Brien
Hyman Berman
Attorney

Patented June 22, 1937

2,084,629

UNITED STATES PATENT OFFICE 2,084,629

REVERSIBLE DISK PLOW

Anthony Robert Coviello, Tulare, Calif.

Application August 24, 1936, Serial No. 97,713

4 Claims. (Cl. 97—31)

My invention relates generally to a disk plow which includes a gang of cultivator disks which may be moved to either side of the cultivator, so as to become reversed when moved from one side of the cultivator to the other side of the cultivator, in exactly the proper angular relationship, and an important object of the invention is to provide a simple, relatively inexpensive, and mechanically efficient arrangement of this character.

Another important object of my invention is to provide reversible cultivator disks in a cultivator so arranged that the operator may go down one side of a field so as to throw the earth plowed outwardly and when he reaches the end of the furrow, turn the cultivator around, reverse the cultivator disk gang, and return in the same furrow, and throw the earth in an opposite or in the same direction as may be desired; thereby eliminating the present necessity to plow around a field and produce a "sink" having "dead furrows" in the middle of the field necessitating scraping or leveling each year.

Other important objects of my invention will be apparent from a reading of the following description taken in connection with the drawings, wherein for purposes of illustration I have shown a preferred embodiment of my invention.

In the drawings:—

Figure 1 is a general top plan view of the embodiment.

Figure 2 is a general side elevational view of the right hand side of the device.

Figure 3 is a transverse vertical sectional view taken through Figure 1 and looking forwardly in the direction of the arrows.

Figure 4 is a longitudinal sectional view taken through Figure 1 approximately on the line 4—4.

Figure 5 is a perspective view of the cam bar operating link.

Figure 6 is a perspective view of the eccentric.

Figure 7 is a perspective view of the rotary toothed segment.

Figure 8 is a perspective view of the tail wheel operating arm.

Figure 9 is a fragmentary elevational view showing the mounting of the main supporting wheel assembly permitting ground engagement of the cultivator disks or elevation of the disks out of contact with the ground.

Referring in detail to the drawings, the numeral 5 generally designates the truncated diamond-shaped frame which is truncated at the front end as indicated by the numeral 6 and has the side channels 7 and 8 connected together by an inverted U-shaped frame member 9, the connection being made by suitable bolts or rivets 10, so that the legs 11 and 12 depend from the frame and form supports for the axle 13 which has the depending wheel supporting portions 14 and 15, respectively, on which are journaled the main ground engaging supporting wheels 16 and 17. When the depending portions 14 and 15 are in a horizontal position as indicated in Figure 2, the wheels 16 and 17 are in a position to permit the cultivator disks to engage the ground 19. When the cultivator is to be trundled over rough ground or in any case in which the cultivator disks are not to be engaged with the ground, the axle may be swung so as to place the wheels rearwardly as indicated in Figure 9 with the portions 14 and 15 vertical by the use of a power lift to raise the corresponding end of the plow. Attached as indicated by the numerals 20 in a pivotal manner to the legs 11 and 12 are the forwardly converging arms of the draft means which is generally designated 21 and which has a suitable connection means 22 at its front end for connection to a tractor or the like.

Across the widest part of the frame and attached to the bottom flanges of the side members 7 and 8 is the slide supporting bar 23 on which the cultivator beam which is generally designated 24 slidably rests its front end. The rear end of the cultivator disks supporting bar 24 is pivoted as indicated by the numeral 25 between the upper and lower furcations of a block 26 which is fastened between the parallel rear end portions 27 of the side channels 7 and 8. The pivot effecting the connection 25 is the eccentric shown in Figure 6 which has the upper part 28 directly journaled in the said furcations of the block 26 and the lower eccentric bar 29 operatively engaged between the furcations 30 and 31 of the tail wheel operating arm 32.

The tail wheel 33 is supported by a fork 34 which is swivelly mounted by means generally designated 35 on the rear end of the arm 32.

A vertical axle 36 journaled in the block 26 at the rear of the frame 5 pivotally traverses the hole 36' in the tail wheel operating arm 32 and has a head 37' holding the arm 32 in place thereon and a spacer 37 located between the bottom of the frame 5 and the top of the arm 32.

Above the frame 5 is swingably mounted on the axle 36 the gang beam operating lever 39 which is held in place on the axle 36 by a collar 38.

The cultivator gang beam which is generally designated 24 comprises two longitudinal side members 40 which are spaced by blocks 41, 42 and 43. The blocks 41 and 42 have depending portions 44 and 45 which journal the respective disk supporting shafts 46 and 47 which have stop collars 48 and 49 engaged with the lower end of the portions 44 and 45 and angulated portions 50 and 51 which directly support at the proper angle the cultivator disks 52 and 53. The block 43 has a slide bearing portion 54 which slidably rests on the slide supporting bar 23.

The upper furcation 55 of the block 26 of the frame as well as the lower furcation 56 are traversed by the eccentric 25 as clearly shown in Figure 4 and a portion of the rear end of the block 41 of the cultivator beam lies between the furcations 55 and 56. The upper furcation 55 has its forward end in the form of a sector gear which is in mesh with a sector gear 57 which is pinned as indicated by the numeral 58 to the disk shaft 46, which sector 57 is in mesh with the sector 55 and spaced from the top of the beam by a suitable washer 59. A similar washer 60 is on the cultivator disk shaft 47 and above this is a retainer 61 which is pinned as indicated by the numeral 62 to the cultivator disk shaft 47.

Both the sector 57 and the retainer 61 have lateral arms 63 and 64 which are pivoted as indicated by the numerals 65 and 66 to the opposite ends of a connecting link 67. An intermediate portion of the gang operating lever 39 is pivoted on the cultivator disk shaft 46 above the sector 57 and this connection is held in place by a washer 68 retained by a cotter key or the like 69.

It will be obvious that the lever 39 overlying or approximately overlying the beam 24 in the position shown in Figure 1, will, in the act of being swung toward the opposite side of the cultivator frame 5, cause the beam 24 to move about the pivot 25 to the opposite side of the frame and at the same time swing the cultivator disks 52 and 53 to opposite but similar angular positions at the opposite side of the frame, thereby accomplishing the reversing mentioned herein.

Means for holding the beam in either of the operative positions comprises the rearwardly extending angle irons 70 and 71 which are fastened as indicated by the numerals 73 and 74 to the bight portion of the frame member 9 and which have journaled at their rear ends through their vertical flanges the cam axle 75 which has on its opposite end locking cams 76 and 77 so positioned that the angular faces thereof may engage the laterally inward side of the beam and wedge the same in operative position at the corresponding side of the frame when the cams operated through the linkage which comprises the lateral fixed arm 78, the double bent operating link 79 pivotally engaged with the end of the arm 78 and with a depending portion 80 on the bell crank 81 which is pivoted as indicated by the numeral 82 between the members 70 and 71. A helical spring 83 stretched between the journal portion 84 of the link 79 and the pivotal mounting 82 keeps the upper portion 85 of the bell crank 81 in the elevated position in which position the cams are in the operated position. The operator of the cultivator may place his foot upon the portion 85 and depress the bell crank so as to place the cams in their releasing positions so as to permit the beam 24 to be swung by means of the lever 39 to either side of the frame.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is: —

1. A cultivator of the character described, said cultivator comprising a frame including supporting wheel means, a tail wheel, and a cultivator disk supporting beam, first means pivoting the rear part of said beam to a rear part of said frame, and second means for swinging said beam to one side or the other of said frame, said beam including cultivator disks, rotary shafts carrying said disks on said beam, link means connecting said rotary shafts for simultaneous and similar rotation relative to said frame and said beam.

2. A cultivator of the character described, said cultivator comprising a frame including supporting wheel means, a tail wheel, and a cultivator disk supporting beam, first means pivoting the rear part of said beam to a rear part of said frame, and second means for swinging said beam to one side or the other of said frame, said beam including cultivator disks, rotary shafts carrying said disks on said beam, link means connecting said rotary shafts for simultaneous and similar rotation relative to said frame and said beam, and third means operatively connecting a portion of said frame and a portion of said beam whereby swinging of said beam effects reversing in position of said disks.

3. A cultivator of the character described, said cultivator comprising a frame including supporting wheel means, a tail wheel, and a cultivator disk supporting beam, first means pivoting the rear part of said beam to a rear part of said frame, and second means for swinging said beam to one side or the other of said frame, said beam including cultivator disks, rotary shafts carrying said disks on said beam, link means connecting said rotary shafts for simultaneous and similar rotation relative to said frame and said beam, and third means operatively connecting a portion of said frame and a portion of said beam whereby swinging of said beam effects reversing in position of said disks, and fourth means operating between said third means and said tail wheel for castering said tail wheel to the corresponding side of said frame.

4. A cultivator of the character described, said cultivator comprising a frame including supporting wheel means, a tail wheel, and a cultivator disk supporting beam, first means pivoting the rear part of said beam to a rear part of said frame, and second means for swinging said beam to one side or the other of said frame, and manually operated cam means on said frame for engaging and locking said beam at either side of said frame.

ANTHONY ROBERT COVIELLO.